United States Patent
Koike et al.

(10) Patent No.: US 11,618,815 B2
(45) Date of Patent: Apr. 4, 2023

(54) RESIN COMPOSITION, MOLDED BODY, ELECTRONIC PART, AND ELECTRONIC DEVICE

(71) Applicant: RICOH COMPANY, LTD., Tokyo (JP)

(72) Inventors: Natsuki Koike, Kanagawa (JP); Yasushi Akiba, Kanagawa (JP); Mitsuyo Matsumoto, Kanagawa (JP); Yoshitaka Sekiguchi, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 298 days.

(21) Appl. No.: 16/908,066

(22) Filed: Jun. 22, 2020

(65) Prior Publication Data
US 2021/0009799 A1    Jan. 14, 2021

(30) Foreign Application Priority Data

Jul. 12, 2019 (JP) .............................. JP2019-130084

(51) Int. Cl.
*C08L 25/06*    (2006.01)

(52) U.S. Cl.
CPC ........... *C08L 25/06* (2013.01); *C08L 2203/20* (2013.01); *C08L 2205/03* (2013.01)

(58) Field of Classification Search
CPC .. C08L 25/06; C08L 2203/20; C08L 2205/03; C08L 55/02; C08L 69/00; C08L 85/02; C08K 5/5399; C08K 5/0066; C08K 5/49; C08K 3/016; C08K 3/32

USPC ......................................................... 524/96
See application file for complete search history.

(56) References Cited

U.S. PATENT DOCUMENTS

| 2014/0275397 A1 | 9/2014 | Akiba et al. |
| 2014/0371359 A1 | 12/2014 | Akiba et al. |
| 2017/0152368 A1 | 6/2017 | Akiba et al. |

FOREIGN PATENT DOCUMENTS

| JP | 9-217000 | | 8/1997 |
| JP | 10-306207 | | 11/1998 |
| JP | 2016-003290 | | 1/2016 |
| JP | 2016003290 A | * | 1/2016 |
| JP | 2017-095667 | | 6/2017 |

* cited by examiner

*Primary Examiner* — Ling Siu Choi
*Assistant Examiner* — Ronald Grinsted
(74) *Attorney, Agent, or Firm* — Grüneberg and Myers PLLC

(57) ABSTRACT

A resin composition is provided. The resin composition comprises an acrylonitrile butadiene styrene resin, a polystyrene resin, a polycarbonate resin, and a phosphorus compound. The amount of the polystyrene resin is equal to or greater than the amount of the acrylonitrile butadiene styrene resin. The amount of the polycarbonate resin is from 70 to 90 parts by mass with respect to 100 parts by mass of all the resins. The phosphorus compound contains a phosphazene compound, and the amount of the phosphazene compound is from 0.1 to 4.0 parts by mass with respect to 100 parts by mass of all the resins.

11 Claims, No Drawings

RESIN COMPOSITION, MOLDED BODY, ELECTRONIC PART, AND ELECTRONIC DEVICE

CROSS-REFERENCE TO RELATED APPLICATIONS

This patent application is based on and claims priority pursuant to 35 U.S.C. § 119(a) to Japanese Patent Application No. 2019-130084, filed on Jul. 12, 2019, in the Japan Patent Office, the entire disclosure of which is hereby incorporated by reference herein.

BACKGROUND

Technical Field

The present disclosure relates to a resin composition, a molded body, an electronic part, and an electronic device.

Description of the Related Art

Polymers, which are organic substances, generally burn during a fire. Therefore, flame-retardant resins to which a flame retardant is added are widely used for automobile materials, electric and electronic device materials, housing materials, and parts manufacturing materials in other processing fields. Such resin materials are required to have not only flame retardancy but also good mechanical strength, and particularly to endure impact strength. To meet such a requirement, a resin composition obtained by blending an acrylonitrile butadiene styrene ("ABS") resin or a polystyrene ("PS") resin in a polycarbonate resin ("PC") is known, which is popular in the market for the ease of creating a good appearance by injection molding. In particular, PC/PS alloys have been used for the purpose of cost reduction.

SUMMARY

In accordance with some embodiments of the present invention, a resin composition is provided. The resin composition comprises an acrylonitrile butadiene styrene resin, a polystyrene resin, a polycarbonate resin, and a phosphorus compound. The amount of the polystyrene resin is equal to or greater than the amount of the acrylonitrile butadiene styrene resin. The amount of the polycarbonate resin is from 70 to 90 parts by mass with respect to 100 parts by mass of all the resins. The phosphorus compound contains a phosphazene compound, and the amount of the phosphazene compound is from 0.1 to 4.0 parts by mass with respect to 100 parts by mass of all the resins.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

According to some embodiments of the present invention, a resin composition is provided that keeps costs low and keeps mechanical strength and flame retardancy at certain levels.

Embodiments of the present invention are described below.

PC resin is excellent in mechanical strength and flame retardancy but is costly. One approach to reduce the cost involves increasing the amount of PS resin in a PC/PS alloy, but this results in poor compatibility and deterioration of mechanical strength and flame retardancy.

The resin composition according to an embodiment of the present invention contains a PC resin, a PS resin, an ABS resin, and a phosphorus compound containing a phosphazene compound. The amount of the PC resin is from 70 to 90 parts by mass with respect to 100 parts by mass of the, and the amount of the PS resin is equal to or greater than the amount of the ABS resin. The amount of the phosphazene compound is from 0.1 to 4.0 parts by mass with respect to 100 parts by mass of all the resins. As a result, the ABS resin readily gets compatible with the PS resin, and the compatibility between the PC resin and the PS resin is improved to stabilize the dispersion state of the PS resin. The phosphazene compound further improves dispersibility. The resin composition is thus able to keep costs low and to keep mechanical strength and flame retardancy at certain levels.

Hereinafter, each component of the resin composition according to an embodiment of the present invention, such as the above-described resins, the phosphorus compound, and additives, are described in detail.

PC Resin

The polycarbonate resin may be, for example, an aromatic homopolycarbonate resin or a copolycarbonate resin obtained by reacting an aromatic divalent phenol compound with phosgene or a carbonic acid diester. Examples of the aromatic divalent phenol compound include, but are not limited to, 2,2-bis(4-hydroxyphenyl)propane, 2,2-bis(4-hydroxy-3,5-dimethylphenyl)propane, bis(4-hydroxyphenyl)methane, 1,1-bis(4-hydroxyphenyl)ethane, 2,2-bis(4-hydroxyphenyl)butane, 2,2-bis(4-hydroxy-3,5-diphenyl)butane, 2,2-bis(4-hydroxy-3,5-diethylphenyl)propane, 2,2-bis(4-hydroxy-3,5-diethylphenyl)propane, 1,1-bis(4-hydroxyphenyl)cyclohexane, and 1-phenyl-1,1-bis(4-hydroxyphenyl)ethane. Each of these may be used alone or as a mixture with others.

As the polycarbonate resin, either synthesized products or commercially-available products may be used. Examples of commercially-available products include, but are not limited to, L-1250Y and AD5503 manufactured by Teijin Chemicals Ltd., A2200 manufactured by Idemitsu Kosan Co., Ltd., and IUPILON S2000 and IUPILON H-3000VR (aromatic polycarbonate resins) manufactured by Mitsubishi Engineering-Plastics Corporation.

One type of the polycarbonate resin may be used alone, or two or more types thereof may be used in combination.

Further, the polycarbonate resin may be a market recovery material recovered from the market. Examples thereof include, but are not limited to, materials recycled from waste disks (e.g., waste CDs) and waste bottles (e.g., gallon bottles of water servers).

The resin composition according to an embodiment of the present invention contains the PC resin in an amount of from 70 to 90 parts by mass, preferably from 70 to 80 parts by mass, particularly preferably 70 parts by mass or more and less than 75 parts by mass, with respect to 100 parts by mass of all the resins. When the amount of the PC resin is from 70 to 90 parts by mass with respect to 100 parts by mass of all the resins, cost reduction is achieved while mechanical strength and flame retardancy are maintained.

The number of parts by mass with respect to 100 parts by mass of all the resins refers to the number of parts by mass when the total of all resins contained in the resin composition is 100 parts by mass.

PS Resin

Preferably, the polystyrene resin has a constitutional unit represented by the following general formula, and contains a rubber component.

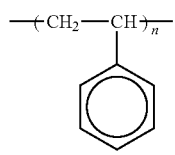

Specific examples of the polystyrene resin include, but are not limited to: a rubber-modified styrene polymer obtained by dissolving a rubber component in a styrene-based monomer and causing a known polymerization such as bulk polymerization and suspension polymerization; and a mixture of a styrene-based monomer and a rubber component, obtained by physically mixing the styrene-based monomer with the rubber component.

Preferred examples of the styrene-based monomer include styrene. Styrene may be used in combination with other styrene-based monomers, such as α-methylstyrene, α-methyl-p-methylstyrene, o-methyl styrene, m-methyl styrene, p-methyl styrene, 2,4-dimethyl styrene, ethylstyrene, p-t-butylstyrene, 1,1-diphenylethylene, bromostyrene, dibromostyrene, chlorostyrene, and dichlorostyrene. When two or more types of styrene-based monomers are used, it is preferable that 50 parts by mass or more of styrene are contained therein.

Examples of the rubber component include, but are not limited to, polybutadiene, styrene-butadiene copolymer, acrylonitrile-butadiene copolymer, polyisoprene, styrene-isoprene copolymer, butadiene-methacrylate copolymer, acrylic rubber, ethylene-propylene rubber, ethylene-propylene-diene rubber, and hydrogenated diene rubber. Each of these rubber components may be used alone or in combination with others. When two or more types of rubber components are used, the mixing ratio thereamong is not particularly limited.

Further, the polystyrene resin may be a market recovery material recovered from the market. Examples thereof include, but are not limited to, materials recycled from home appliances (e.g., air conditioners, televisions, refrigerators, washing machines) and used office automation equipment.

The resin composition according to an embodiment of the present invention can be reduced in cost by containing the PS resin. The higher the content of the PS resin in the resin composition, the lower the cost. To achieve low cost and good mechanical strength and flame retardancy at the same time, the amount of the PS resin is preferably 5 parts by mass or more and less than 29 parts by mass, more preferably 15 parts by mass or more and less than 23 parts by mass, with respect to 100 parts by mass of all the resins.

ABS Resin

The method for producing the ABS resin is not particularly limited. Examples thereof include, but are not limited to: an emulsion polymerization method in which emulsified styrene and acrylonitrile monomers are mixed with emulsified rubber to be polymerized; and a bulk suspension polymerization method in which a rubber is made to dissolve in styrene and acrylonitrile monomers to cause bulk polymerization and this polymerization liquid is made to suspend in water during the polymerization to continue the polymerization under suspension polymerization conditions. In alloying the ABS resin with the PC resin, the PS resin, or the like, a suitable polymerization method is selected according to the properties of the ABS resin used. In general, the ABS resin is capable of alloying regardless of whether it is produced by the emulsion polymerization method or the bulk suspension polymerization method.

Further, the ABS resin may be a market recovery material recovered from the market. Examples thereof include, but are not limited to, materials recycled from home appliances (e.g., air conditioners, televisions, refrigerators, washing machines) and used office automation equipment.

The rate of content of the ABS resin is equal to or smaller than the rate of content of the PS resin. That is, the number of parts by mass of the ABS resin with respect to 100 parts by mass of all the resins is equal to or smaller than the number of parts by mass of the PS resin with respect to 100 parts by mass of all the resins. When the rate of content of the ABS resin is larger than that of the PS resin, the dispersibility of the PS resin becomes poor and flame retardancy and impact resistance become insufficient. When the rate of content of the ABS resin is equal to or smaller than that of the PS resin, the compatibility between the PC resin and the PS resin is improved and the dispersibility of the PS resin is improved. That is, the ABS resin is used like a compatibilizer. The amount of the PS resin is preferably from 5 to 29 parts by mass with respect to 100 parts by mass of all the resins. To make the PS resin compatible, the amount of the ABS resin contained is preferably 2 parts by mass or more with respect to 100 parts by mass of all the resins.

Other Resins

The resin composition according to an embodiment of the present invention may further contain, in addition to the PC resin, the PS resin, and the ABS resin, a polypropylene ("PP") resin and a polyethylene ("PE") resin, as long as flame retardancy, rigidity, and impact resistance are not significantly reduced.

Phosphorus Compound

The resin composition according to an embodiment of the present invention contains a phosphorus compound as a flame retardant, and the phosphorus compound contains a phosphazene compound. Preferably, the phosphorus compound contains a phosphazene compound and a phosphorus compound excluding the phosphazene compound (hereinafter "non-phosphazene phosphorus compound").

Phosphazene Compound

As the phosphazene compound, a phosphazene compound represented by the following general formula is preferred for its ease of production and stability.

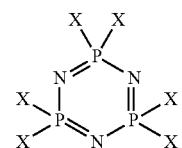

where each of X's independently represents a halogen atom, an aromatic chain, or an aliphatic chain.

The number of members constituting the ring in the phosphazene compound may be increased depending on the production method, but is not particularly limited and can be suitably selected to suit to a particular application.

The side chain group X in the above general formula, i.e., an aliphatic chain or an aromatic chain, may have an alkoxy group structure, or may have a halogen element at a terminal.

A compound forming the alkoxy group may be any compound such as an aliphatic compound and an aromatic compound. In particular, a compound containing an aromatic ring is preferred for the stability of the phosphazene compound and the solubility in the phosphorus compound.

Among these, X is preferably a phenoxy group.

The amount of the phosphazene compound contained in the resin composition is from 0.1 to 4.0 parts by mass with respect to 100 parts by mass of all the resins. Preferably, the amount is from 1.0 to 3.0 parts by mass with respect to 100 parts by mass of all the resins.

When the amount is less than 0.1 parts by mass, the amount is too small to achieve an object of the present invention. When the amount is more than 4.0 parts by mass, the phosphazene compound is likely to aggregate in the resin composition during kneading, which is not preferred. When the amount is 4.0 parts by mass or less, the phosphazene compound is less likely to aggregate in the resin composition, which makes it easy to achieve an object of the present invention.

Non-Phosphazene Phosphorus Compound

Preferably, the phosphorus compound contains a non-phosphazene phosphorus compound in combination with the phosphazene compound, to prevent aggregation of the phosphazene compound.

Examples of the non-phosphazene phosphorus compound include, but are not limited to, red phosphorus, phosphate, ammonium polyphosphate, sodium polyphosphate, and phosphinic acid metal salt. Among these, red phosphorus and/or phosphate are preferred. In the present disclosure, a simple substance of phosphorus is treated as one type of the phosphorus compound.

Among these, a phosphate that melts at the kneading temperature is preferred.

Such a phosphate is a compound having a melting point (Tm), which is preferably less than 300 degrees C., more preferably less than 200 degrees C., particularly preferably less than 100 degrees C. The most preferred lower limit of Tm is 0 degrees C. or higher, but the lower limit of Tm is not limited to this as long as the phosphate gets melted during kneading. However, when Tm is less than −40 degrees C., the phosphate dispersed in the resin significantly bleeds out to the surface of the resin composition with time, which is not preferred.

Some phosphates do not exhibit Tm and therefore do not melt during kneading but get three-dimensionalized. Such compounds are not suitable for the present disclosure.

Examples of the phosphate include, but are not limited to: tri(alkylphenyl) phosphate, di(alkylphenyl) monophenyl phosphate, diphenyl mono(alkylphenyl) phosphate, triphenyl phosphate, and a mixture of two or more of these phosphates; and compounds represented by the following general formula (2) and a mixture of two or more of these compounds.

General Formula (2)

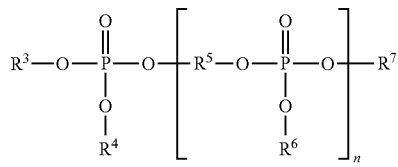

In the general formula (2), each of $R^3$ to $R^7$ independently represents a group containing an aromatic ring, and n represents a numeral of from 1 to 10,000.

Preferably, each of $R^3$ to $R^7$ is an aryl group or an alkyl-substituted aryl group. Each of $R^3$, $R^4$, $R^6$ and $R^7$ is preferably a phenyl group or a phenyl group substituted with an alkyl group such as methyl, ethyl, isopropyl, t-butyl, isobutyl, isoamyl, and t-amyl; and more preferably a phenyl group or a phenyl group substituted with methyl, ethyl, isopropyl, or t-butyl group. $R^5$ is preferably a derivative of an aryl group or an alkyl-substituted aryl group, more preferably a derivative of resorcinol, hydroquinone, or bisphenol-A.

The phosphorus compound may be added at the time of kneading the resin composition. Alternatively, the phosphorus compound may be kneaded with polymers other than the PC resin in advance, then the kneaded product may be added at the time of kneading the resin composition.

The total amount of the phosphorus compound including the phosphazene compound is preferably less than 16 parts by mass, more preferably 3.5 parts by mass or more but less than 16 parts by mass, with respect to 100 parts by mass of all the resins, to prevent deterioration of mechanical strength. When it is less than 16 parts by mass, impact strength does not decrease.

In a case in which the non-phosphazene phosphorus compound is a phosphate, the amount thereof is preferably 5 parts by mass or more, more preferably 8 parts by mass or more, with respect to 100 parts by mass of all the resins. In the case of red phosphorus, since the rate of phosphorus content is high, the flame retardant effect can be exerted with a small amount. The amount thereof is preferably 1 part by mass or more and less than 8 parts by mass with respect to 100 parts by mass of all the resins. When the amount is less than 8 parts by mass, physical properties are not affected.

Other Additives

The resin composition according to an embodiment of the present invention may further contain other additives such as stabilizers, dyes, and pigments, as long as the properties such as flame retardancy, rigidity, and impact resistance are not significantly reduced.

As a method for identifying the resins or the like contained in the resin composition, infrared spectroscopy can be used. Specifically, the resins and the phosphorus compound can be identified by observing the structures of the resins and the phosphorus compound from an image of the composition and acquiring spectra thereof.

After identification of the composition, each resin can be quantified by GCMS (gas chromatography mass spectrometry) by creating a calibration curve for each resin.

The phosphorus compound can also be quantified by GCMS in the same manner after being extracted to a solvent.

The resin composition according to an embodiment of the present invention has, when molded into a test piece, a Charpy impact strength of 7.0 kJ/m² or higher at 23 degrees C. When the Charpy impact strength is 7.0 kJ/m² or higher, it can be said that toughness is high. The Charpy impact strength is more preferably 8.0 kJ/m$^2$ or higher, further preferably 10.0 kJ/m$^2$ or higher.

The Charpy impact strength is measured, in accordance with ISO 179-1, by preparing a notched impact test piece and conducting the test using a Charpy impact tester at 23 degrees C.

Further, the resin composition according to an embodiment of the present invention has, when molded into a test piece, a tensile strength of 40 MPa or higher at 23 degrees C. When the tensile strength is 40 MPa or higher, it can be said that rigidity is high. The tensile strength is more preferably 50 MPa or higher, further preferably 55 MPa or higher.

The tensile strength is measured in accordance with ISO 527-2 at 23 degrees C.

Description of Electronic Device

Molded Body

A molded body according to an embodiment of the present invention comprises the resin composition according to an embodiment of the present invention.

Examples of the molded body include, but are not limited to, members of information/mobile devices (e.g., computers, laptop computers, tablet terminals, smartphones, mobile phones) and OA devices (e.g., printers, copiers). In particular, the molded body is preferably used for exterior members that require heat resistance.

The molded body may be obtained by, for example, injection molding the resin composition in accordance with a conventional method.

Electronic Part and Electronic Device

An electronic part according to an embodiment of the present invention comprises the molded body according to an embodiment of the present invention.

An electronic device according to an embodiment of the present invention comprises the molded body according to an embodiment of the present invention.

Examples of the electronic part include, but are not limited to, electronic parts of information/mobile devices (e.g., computers, laptop computers, tablet terminals, smartphones, mobile phones) and OA devices (e.g., printers, copiers).

Examples of the electronic device include, but are not limited to, information/mobile devices (e.g., computers, laptop computers, tablet terminals, smartphones, mobile phones), OA devices (e.g., printers, copiers), and home appliances (e.g., televisions, refrigerators, vacuum cleaners).

Method for Producing Resin Composition

A method for producing the resin composition according to an embodiment of the present invention may include a melt-kneading process for melt-kneading the PC resin, the PS resin, the ABS resin, the phosphorus compound, optionally-added components, and other additives as needed.

Melt-Kneading Process

In the method for producing the resin composition, first, the necessary components, optionally-added components, and other additives as needed are melt-kneaded ("melt-kneading process").

This process makes the components uniformly mixed with each other.

In this process, the above components are kneaded using a kneader known in the art, such as a TUMBLER MIXER, a HENSCHEL MIXER, a BANBURY MIXER, a roll, a single-screw extruder, a twin-screw extruder, and a kneader, while appropriately adjusting the conditions such as kneading speed, kneading temperature, and kneading time.

For example, the above components may be mixed in advance using a TUMBLER MIXER or a HENSCHEL MIXER, then melt-kneaded using a BANBURY MIXER, a roll, a single-screw extruder, a twin-screw extruder, or a kneader. Alternatively, the components may be put into an extruder using a feeder and then melt-kneaded, without being mixed in advance. Alternatively, only a part of the components may be mixed in advance and melt-kneaded to prepare a master batch, then the master batch is melt-kneaded again with the remaining components.

Preferably, the optionally-added components are melt-mixed in advance and then put into a twin-screw extruder, but the process is not limited thereto. In a case in which the optionally-added components include a phosphate that is liquid at room temperature, the phosphazene compound can be dissolved in the phosphate at room temperature. In a case in which the optionally-added components include a phosphate that is solid (e.g., powdery) at room temperature, the phosphazene compound and the phosphate may be premixed in a mortar, then the mixture may be heated to 90 degrees C. or higher to melt, and the melted mixture may be introduced into a twin-screw extruder.

The premixing of the phosphate and the phosphazene compound is one example of the melt-kneading process, which is preferred for enhancement of the dispersibility of the phosphorus compound. However, the premixing is not essential for the method for producing the resin composition according to an embodiment of the present invention. Further, the mixing using a mortar is one example of mixing process, and the mixing process is not limited thereto in the method for producing the resin composition according to an embodiment of the present invention.

In particular, the kneading temperature is determined based on the melting temperature (Tm) of the PC resin. Like the glass transition temperature (Tg), Tm may be measured by means of DSC (differential scanning calorimetry), TMA (thermomechanical analysis), DTA (differential thermal analysis), or a rheometer capable of changing the temperature. The resin composition according to an embodiment of the present invention is easily produced by performing the kneading at around Tm that is measured by these means.

At temperatures lower than Tm, shear flow effectively works to inhibit formation of domains of the phosphazene compound, which is preferred. In particular, when the kneading temperature ranges from less than Tm to Tg+20 degrees C., favorable results are delivered.

It is known that Tm and Tg vary depending on the measuring method. In the present disclosure, Tm and Tg values measured by DSC are preferred.

EXAMPLES

Examples 1 to 12 and Comparative Examples 1 to 5

Raw materials (parts by mass) presented in Tables 1 and 2 were blended and kneaded using a twin-screw extruder (manufactured by TECHNOVEL CORPORATION) having a screw diameter of 25 mm and a screw effective length L/D of 26 at a cylinder temperature of 230 degrees C. Thus, each resin composition was prepared.

Each resin composition was melted at a set temperature of 240 degrees C. and injection-molded into a test piece.

Details for the raw materials listed in Tables 1 and 2 are described below.

In Tables 1 and 2, the columns labeled "Parts" show the number of parts by mass of each raw material blended, and the columns "Rate" show the number of parts by mass of each raw material blended with respect to 100 parts by mass of all the resins.

Raw Materials

Resins

PC resin: H-3000VR (manufactured by Mitsubishi Engineering-Plastics Corporation)

PS resin: H650 (manufactured by Toyo Styrene Co., Ltd.)

ABS resin: 250-X10 (manufactured by Toray Industries, Inc.)

Phosphorus Compounds

Phosphazene compound: SPS100 (manufactured by Otsuka Chemical Co., Ltd., the main component is an aromatic phosphazene compound having a 6-membered cyclic structure, all six side chains of which are phenoxy groups)

Phosphate: PX-200 (manufactured by DAIHACHI CHEMICAL INDUSTRY CO., LTD., an aromatic condensed phosphate having a melting point of 92 degrees C. or higher)

Red phosphorus: High-purity red phosphorus (manufactured by NIPPON CHEMICAL INDUSTRIAL CO., LTD.)

Evaluation Test Method

The above-prepared test pieces were subjected to the following evaluation tests.

Impact Test

An impact test was performed according to ISO 179-1 at 23 degrees C. using a Charpy impact tester. The test piece had been notched. The higher the measured value ($kJ/m^2$), the better the impact resistance.

Evaluation Criteria

Rank: Measured value ($kJ/m^2$)

A: 10.0 or higher

B: 8.0 or higher and lower than 10.0

C: 7.0 or higher and lower than 8.0

D: lower than 7.0

Tensile Test

A tensile test was performed according to ISO 527-2 at 23 degrees C. The higher the measured value (MPa), the more excellent the rigidity (tensile strength).

Evaluation Criteria

Rank: Measured value (MPa)

A: 55 or higher

B: 50 or higher and lower than 55

C: 40 or higher and lower than 50

D: lower than 40

Flammability Test

A flame-retardancy test was performed in accordance with the UL 94 (the standard for safety of flammability of plastic materials for parts in devices) released by Underwriters Laboratories Inc. ("UL") of the United States. The thickness t of the test piece was set to 1.5 mm.

First, the UL 94V test was performed to determine the classification "V-0", "V-1", or "V-2".

Next, materials classified into "V-0" and "V-1" in the UL 94V test were subjected to the UL 94-5V test to determine the classification "5V-A" or "5V-B".

A case in which the result of the UL 94-5V test was neither "5V-A" nor "5V-B" is indicated as "-" in Tables 1-3.

A case in which the result of the UL 94-5V test was "5V-A" or "5V-B" was evaluated to be acceptable. A case in which the result of the UL94-5V test was neither "5V-A" nor "5V-B" was evaluated to be unacceptable, even when the result of the UL 94V test was "V-0" or "V-1".

Rate of PS Resin

The cost was evaluated by the rate of the PS resin.

Evaluation Criteria

Rank: Compounding rate (number of parts by mass with respect to 100 parts by mass of all the resins)

A: 15 or more

B: 10 or more and less than 15

C: 5 or more and less than 10

D: less than 5

Tables 1 and 2 present numerical values indicating the composition, Charpy impact strength, tensile strength, and flame retardancy of the resin compositions of Examples and Comparative Examples.

Table 3 presents the evaluation results of the resin compositions of Examples and Comparative Examples.

TABLE 1

| | | Examples | | | | | | | | | |
|---|---|---|---|---|---|---|---|---|---|---|---|
| | | 1 | | 2 | | 3 | | 4 | | 5 | |
| Components | | Parts | Rate | Parts | Rate | Parts | Rate | Parts | Rate | Parts | Rate |
| PC Resin | | 65 | 74 | 79 | 90 | 62 | 70 | 62 | 70 | 79 | 90 |
| PS Resin | | 18 | 20 | 6 | 7 | 18 | 20 | 25 | 28 | 4.5 | 5 |
| ABS Resin | | 5 | 6 | 3 | 3 | 8 | 9 | 1 | 1 | 4.5 | 5 |
| Phosphorus Compound | Phosohazene Compound | 2 | 2.3 | 2 | 2.3 | 2 | 2.3 | 2 | 2.3 | 2 | 2.3 |
| | Red Phosphorus | 0 | 0 | 0 | 0 | 0 | 0 | 0 | 0 | 0 | 0 |
| | PX-200 | 10 | 11.4 | 10 | 11.4 | 10 | 11.4 | 10 | 11.4 | 10 | 11.4 |
| Charpy Impact Strength | $kJ/m^2$ | 11.6 | | 13.5 | | 9.0 | | 7.5 | | 15.5 | |
| Tensile Strength | (MPa) | 55 | | 61 | | 53 | | 45 | | 62 | |
| Flame Retardancy (t 1.5 mm) | V | V-0 | | V-0 | | V-0 | | V-0 | | V-0 | |
| | 5V | 5VB | | 5VB | | 5VB | | 5VB | | 5VB | |

| | | Examples | | | | | | | |
|---|---|---|---|---|---|---|---|---|---|
| | | 6 | | 7 | | 8 | | 9 | |
| Components | | Parts | Rate | Parts | Rate | Parts | Rate | Parts | Rate |
| PC Resin | | 64 | 73 | 65 | 70 | 65 | 74 | 65 | 74 |
| PS Resin | | 12 | 14 | 18 | 19 | 18 | 20 | 18 | 20 |
| ABS Resin | | 12 | 14 | 10 | 11 | 5 | 6 | 5 | 6 |

TABLE 1-continued

| | | | | | | | | | | |
|---|---|---|---|---|---|---|---|---|---|---|
| Phosphorus Compound | Phosohazene Compound | 2 | 2.3 | 2 | 2.2 | 3.5 | 4.0 | 0.1 | 0.1 |
| | Red Phosphorus | 0 | 0 | 0 | 0 | 0 | 0 | 0 | 0 |
| | PX-200 | 10 | 11.4 | 5 | 5.4 | 8.5 | 9.7 | 11.9 | 13.5 |
| Charpy Impact Strength | kJ/m² | 8.2 | | 9.0 | | 11.0 | | 11.2 | |
| Tensile Strength | (MPa) | 52 | | 50 | | 54 | | 54 | |
| Flame Retardancy (t 1.5 mm) | V | V-0 | | V-0 | | V-0 | | V-0 | |
| | 5V | 5VB | | 5VB | | 5VB | | 5VB | |

TABLE 2

| | | Examples | | | | | | Comparative Examples | | | | | | | | |
|---|---|---|---|---|---|---|---|---|---|---|---|---|---|---|---|---|
| | | 10 | | 11 | | 12 | | 1 | | 2 | | 3 | | 4 | | 5 |
| Components | | Parts | Rate | Parts | Rate | Parts | Rate | Parts | Rate | Parts | Rate | Parts | Rate | Parts | Rate | Parts | Rate |
| PC Resin | | 65 | 74 | 65 | 74 | 61 | 73 | 55 | 63 | 65 | 74 | 65 | 76 | 65 | 74 | 65 | 74 |
| PS Resin | | 18 | 20 | 18 | 20 | 17 | 20 | 28 | 32 | 5 | 6 | 0 | 0 | 18 | 20 | 18 | 20 |
| ABS Resin | | 5 | 6 | 5 | 6 | 5 | 6 | 5 | 6 | 18 | 20 | 21 | 24 | 5 | 6 | 5 | 6 |
| Phosphorus Compound | Phosohazene Compound | 2 | 2.3 | 3.5 | 4.0 | 2 | 2.4 | 2 | 2.3 | 2 | 2.3 | 1.5 | 1.7 | 10 | 11.4 | 0 | 0 |
| | Red Phosphorus | 3 | 3.4 | 0 | 0 | 0 | 0 | 0 | 0 | 0 | 0 | 0 | 0 | 0 | 0.00 | 0 | 0 |
| | PX-200 | 7 | 8.0 | 0 | 0 | 15 | 18.1 | 10 | 11.4 | 10 | 11.4 | 12.5 | 14.5 | 2 | 2.3 | 12 | 13.6 |
| Charpy Impact Strength | kJ/m² | 11.0 | | 7.8 | | 7.1 | | 5.5 | | 5.2 | | 3.6 | | 3.0 | | 10.5 | |
| Tensile Strength | (MPa) | 54 | | 49 | | 49 | | 38 | | 43 | | 62 | | 51 | | 55 | |
| Flame Retardancy (t 1.5 mm) | V | V-0 | | V-0 | | V-0 | | V-0 | | V-0 | | V-0 | | V-0 | | V-2 | |
| | 5V | 5VB | | 5VB | | 5VB | | — | | — | | — | | 5VB | | — | |

TABLE 3

| | | Examples | | | | | | | | | | | | Comparative Examples | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 1 | 2 | 3 | 4 | 5 |
| Charpy Impact Strength | | A | A | B | C | A | B | B | A | A | A | C | C | D | D | D | D | A |
| Tensile Strength | | A | A | B | B | A | B | B | B | B | C | C | C | D | C | A | B | A |
| Flame Retardancy (t 1.5 mm) | V | V-0 | V-0 | V-0 | V-0 | V-0 | V-0 | V-0 | V-0 | V-0 | V-0 | V-0 | V-0 | V-0 | V-0 | V-0 | V-0 | V-2 |
| | 5V | 5VB | 5VB | 5VB | 5VB | 5VB | 5VB | 5VB | 5VB | 5VB | 5VB | 5VB | 5VB | — | — | — | 5VB | — |
| Rate of PS Resin | | A | C | A | A | C | B | A | A | A | A | A | A | A | C | D | A | A |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A resin composition, comprising:
   an acrylonitrile butadiene styrene resin;
   a polystyrene resin in an amount of from 5 to less than 29 parts by mass, with respect to 100 parts by mass of all the resins, and in an amount equal to or greater than an amount of the acrylonitrile butadiene styrene resin;
   a polycarbonate resin in an amount of from 70 to 90 parts by mass with respect to 100 parts by mass of all the resins; and
   a phosphorus compound containing a phosphazene compound, an amount of the phosphazene compound being from 0.1 to 4.0 parts by mass with respect to 100 parts by mass of all the resins.

2. The resin composition according to claim 1, wherein an amount of the phosphorus compound is less than 16 parts by mass with respect to 100 parts by mass of all the resins.

3. The resin composition according to claim 1, wherein an amount of the polycarbonate resin is front 70 to 80 parts by mass with respect to 100 parts by mass all the resins.

4. The resin composition according to claim 1, wherein the phosphorus compound further contains at least one of red phosphorus and a phosphate.

5. The resin composition according to claim 1, wherein the resin composition has a Charpy impact strength of 7.0 kJ/m² or higher at 23 degrees C.

6. The resin composition according to claim 1, wherein the resin composition has a tensile strength of 40 MPa or higher at 23 degrees C.

7. A molded body, comprising the resin composition according to claim 1.

8. An electronic part, comprising the molded body according to claim 7.

9. An electronic device, comprising the molded body according to claim 7.

10. The resin composition according to claim 1, wherein an amount of the acrylonitrile butadiene styrene resin is 2 parts by mass or more, with respect to 100 parts by mass of all the resins, and
wherein the amount of the polystyrene resin is from 5 parts by mass or more and less than 29 parts by mass, with respect to 100 parts by mass of all the resins.

11. The resin composition according to claim 1, Wherein an amount of the acrylonitrile butadiene styrene resin is 2 parts by mass or more, with respect to 100 parts by mass of all the resins,
wherein the amount of the polystyrene resin is from 5 parts by mass or more and less than 29 parts by mass, with respect to 100 parts by mass of all the resins, and
wherein the resin composition has a Charpy impact strength of 7.0 kJ/m$^2$ or higher at 23 degrees C.

* * * * *